July 3, 1928.
H. L. MASON
1,675,986
FULL WAY OR GATE VALVE
Filed Oct. 5, 1927
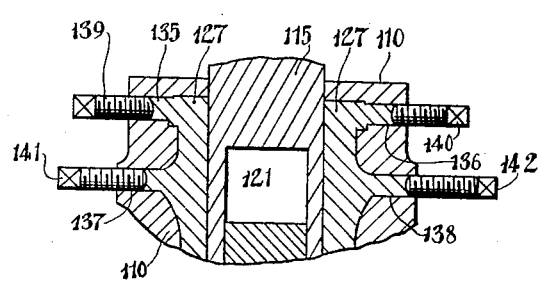
Fig. 3.
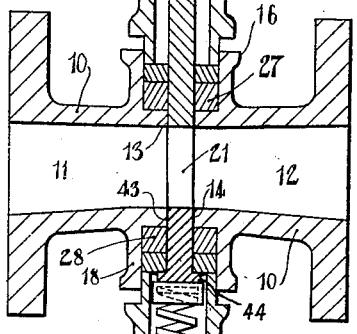
Fig. 1.
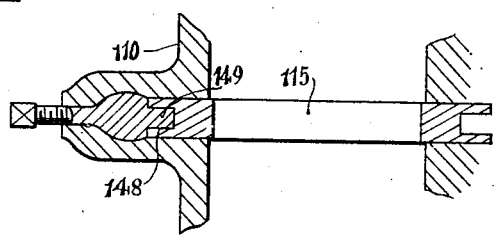
Fig. 4.
Fig. 5.
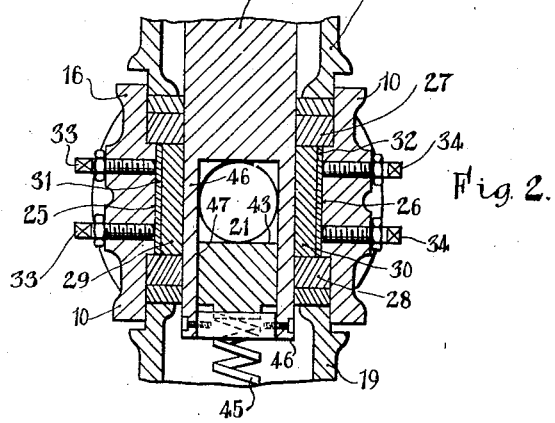
Fig. 2.
Inventor
HAROLD LYALL MASON,
By Toulmin & Toulmin
Attorneys Patented July 3, 1928.

1,675,986

UNITED STATES PATENT OFFICE.

HAROLD LYALL MASON, OF LONDON, ENGLAND.

FULL-WAY OR GATE VALVE.

Application filed October 5, 1927, Serial No. 224,078, and in Great Britain June 7, 1926.

This invention relates to valves of the straight through-way sliding gate type, that is to say of the kind wherein the valve proper has a through passage complemental to, and registrable with, the inlet and outlet bores of the body, the passage coinciding with the bores in the completely open position and thus providing a full-way channel for the flow of the fluid or liquid.

The invention is directed to a valve having a body, inlet and outlet bores thereto, a through passage complemental to and registrable with said inlet and outlet bores, and coinciding with the said bores in the completely open position and thus providing a full-way channel for the flow of the fluid, and a gate provided with continuation members forming means to protect the seating completely in all positions.

Valves of the type described made in accordance with this invention may be further characterized by a gate provided with packing consisting of several sections so disposed as to prevent the leakage of fluid round, over or under the gate, the packing sections accomplishing such purpose being separately controlled and working independently whilst merging into one continuous packing substantially as hereinafter described.

A further feature of this invention may be a gate provided with continuation members adapted to maintain contact between packing and gate in its open position to retain the parts of the packing in place and protect both the packing and seating.

Another feature may be a separate or floating piston or follower adapted on the opening movement of the gate to retain the packing and protect both the packing and the seating.

Also, the invention comprises the combination and arrangement of components constituting a complete valve, as hereinafter described and shown.

The detail construction of valves embodying my invention may take various forms dependent upon the design or service as will be appreciated from the examples I will now describe with reference to the accompanying drawings which illustrate steam valves, wherein:

Fig. 1 is a central vertical section of one form of the invention adapted as a flat gate valve; and Fig. 2 is a sectional view at right angles thereto.

Fig. 3 is a fragmentary vertical section illustrating a modification hereinafter described; and Fig. 4 is a sectional plan thereof.

Fig. 5 is a fragmentary sectional plan of a detail.

I employ, as the valve proper, a piston 15, and a body or casing 10 therefor having an inlet 11 and outlet 12 in axial alignment intermediate of its ends. The casing 10 is provided at the upper end with an extension 17 forming a housing for the piston 15 in its open position, and a gland to a stuffing box 16, the operation of the valve 15 being effected in a usual way, such as is indicated at 24 by a hand-wheel and screw to which the extension 17 likewise constitutes a nut. The lower end of the casing 10 is open, but is normally closed by a hollow member 19 forming a gland to a stuffing box 18.

The inner or working faces of the casing 10 adjacent the inlet 11 and outlet 12, and the side faces lengthwise of the valve proper 15, are recessed as represented by the stuffing boxes 16 and 18 and the slots 25 and 26 to compose an uninterrupted channel comprising two horizontal components or limbs in spaced relation, and intermediate vertical components or limbs. In this composite channel I position the packing which may take the form of a continuous length of the same character throughout (as in Figs. 3 and 4), or may take the form of sections of different characters assembled to compose a virtually-continuous length (as in Figs. 1 and 2), as represented at 27, 28, 29 and 30, the packings being in operation controlled by the glands 17 and 19 and the backings 31 and 32 with the aid of the bolt-and-nut means 20 and by the set-pins 33 and 34.

Alternatively, as illustrated in Figs. 3 and 4, all the channel components are at predetermined intervals extending through the body of the casing 110 to the exterior, thus furnishing openings which, in the case of the horizontal components are, tangentially arranged as at 135 and 136, and radially arranged in the case of the complemental component as at 137 and 138. These openings 135 and 136 and 137 and 138 are for the purpose of receiving adjustable plugs 139 and 140 and 141 and 142 whose inner ends are adapted to coact with the packing 127, 128, 129 and 130. The plugs 139, 140, 141 and 142 are rendered adjustable by correspondingly screwing their ends and the openings. The plugs 139, 140, 141 and 142 thus compose a series of point-like contacts functioning as abutments. It will now be seen that in use on appropriately manipulating any one or more of the plugs 139, 140, 141 and 142, the packing can be adjusted to meet any desired requirement.

Referring again to Figs. 1 and 2 the piston 15 constituting the valve proper is of such length that when fully opened the upper horizontal portion 27 of the packing is protected by the lower end of the piston 15, and for similarly protecting the opposite packing portion 28 I provide a piston or follower 43 to operate in the opening at the bottom of the valve casing 10 and the hollow member 19. This member 19, is herein shown as a gland. The lower end of the piston 43 is flanged at 44, to constitute a stop co-acting with the contiguous face of the casing, and is, further, in operation adapted to bear upon one end of a spiral spring 45 whose other end abuts upon the inner face of the plug 19, the spring 45 always functioning to press upon the piston 43 causing it to follow the valve 15 in the opening operation. In operation the reverse operation of the piston 43 is effected by, and on the closing of, the valve proper 15, the end of the latter acting upon the adjacent end of the piston 43 and pushing it in opposition to the spring 45. Thus the piston 43 partakes of the nature of a "float".

For protecting the intermediate packing 29 and 30 during the opening of the valve proper 15 as well as during the period it is open, or assist in doing so, I provide at the end of the valve proper 15 a plurality of spaced extensions 46, 46 (Fig. 2) or wings—two, for instance, diametrically opposed—of a length such as to meet that of the packing with which they co-operate. Incidentally, these extensions or wings, 46, 46, in operation function to maintain the relative alignment of the allied parts; and the extensions or wings 46, 46 constitute the valve proper 15 a kind of perforated piston.

Thus, as will be evident, in operation when the valve proper 15 is opened by rotating hand wheel and screw 24 the piston or float 43 follows it automatically under the agency of the spring 45 until arrested by the stop or flanged end or head 44 in which position it covers the relative packing portion 28 and so saves it from the detrimental scouring and displacing action of the steam, while it simultaneously "makes-up" the level of the inlet and outlet bores 11 and 12 thereby preventing harmful eddies; and the other packing 29, 30 is protected in position by the valve proper and its extensions or wings 46, 46.

Further, it will be evident that in operation when the valve 15 is fully open, it is protected from the action of the flowing liquid or fluid.

In a valve of the flat gate type, I, as illustrated in Figs. 1 and 2, position the packing 27, 28, 29 and 30 about the port-way after the manner already described, and associate the piston or float 43 with the gate 15 so that in operation when the gate 15 is raised the piston or float 43 automatically replaces it and takes up the desired protective and retentive position under the influence of suitably-applied spring pressure 45; the position being maintained until the descent of the gate 15 engages the piston or float 43 and returns it to its original position. The gate 15 may, as indicated in Fig. 5, be slotted at 48 to receive a prolongation 49 of the packing 29 and 30. Thus the seating and packing are protected in all positions.

What I claim and desire to secure by Letters Patent is:

1. A valve of the class described, comprising a body having inlet and outlet bores thereto, a gate valve provided with a through passage registrable with said bores in the completely open position of the valve, a plurality of sections of packing arranged around said inlet and outlet bores of the body for preventing leakage, said packing being in sections which are separably compressible and enclosing extensions on said valve, and an independently movable follower for protecting the packing and movable between said extensions, with yielding means interposed between said follower and a rigid member connected with the casing.

2. In a valve of the class described, the combination with a body having inlet and outlet bores therein, a valve provided with a through passage registrable with said bores in its completely open position to provide a full channel for the flow of the fluid, a plurality of packing sections arranged in the body and disposed about said bores to prevent leakage therethrough from the valve, said valve provided with enclosing extension members, an independently movable follower enclosed by said members and arranged to protect sections of the packing from the pressure of fluid when the valve is in open position, yielding means for permitting movement of the valve relatively to said follower and means to limit the movement of the follower under the impulse of said yielding means, so that said follower will not advance beyond a predetermined point in the opening movement of the valve.

3. In a valve of the class described, the combination of a body provided with inlet and outlet bores, a gate valve having a through passage registrable with said bores when the valve is in open position, parallel extensions from said valve, packing members independently disposed at the edges and the opposite faces of said valve, surrounding the passage therethrough, independent means for adjusting the pressure upon said packings, a movable follower disposed between said valve extensions, yielding means acting upon said follower and means for limiting the movement of the follower relative to the valve as the latter is moved into position for opening the through passageway to the flow of fluid.

In testimony whereof, I affix my signature.

HAROLD LYALL MASON.